(12) United States Patent
Cheong

(10) Patent No.: US 7,141,165 B2
(45) Date of Patent: Nov. 28, 2006

(54) COIN-FILTER MOUNTING STRUCTURE

(75) Inventor: Hae Kyun Cheong, Pusan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 163 days.

(21) Appl. No.: 10/858,022

(22) Filed: Jun. 1, 2004

(65) Prior Publication Data
US 2005/0133429 A1    Jun. 23, 2005

(30) Foreign Application Priority Data
Dec. 22, 2003   (KR) .................. 10-2003-0094350

(51) Int. Cl.
*B01D 35/02* (2006.01)
(52) U.S. Cl. .................. 210/232; 210/446; 29/445; 29/523
(58) Field of Classification Search ............. 210/232, 210/446; 29/445, 523
See application file for complete search history.

(56) References Cited

U.S. PATENT DOCUMENTS 3,206,216 A * 9/1965 Crook .................. 277/637
3,732,985 A * 5/1973 Murrell .................. 210/446
6,547,255 B1 * 4/2003 Donaway et al. .......... 277/602

FOREIGN PATENT DOCUMENTS

| DE | 35 03 658 | 8/1986 |
| EP | 1 091 156 | 4/2001 |
| JP | 08 89720 | 4/1996 |
| JP | 09-096394 | * 4/1997 |

OTHER PUBLICATIONS

Patent Abstracts of Japan of JP 08 89720 dated Apr. 9, 1996.

* cited by examiner

*Primary Examiner*—Thomas M. Lithgow
(74) *Attorney, Agent, or Firm*—Ladas and Parry LLP

(57) ABSTRACT

The present invention discloses a structure for mounting a coin-filter filtering foreign materials contained in hydraulic fluid on a fixing groove formed at an inlet side of an orifice without using O-ring. A coin-filter mounting structure according to the present invention comprises a body having a fixing groove formed at an inlet side of an orifice, and a holder supporting the border of a coin-filter filtering out foreign materials contained in hydraulic fluid flowing through the orifice, and fixed to the fixing groove through plastic deformation after being mounted on the fixing groove.

3 Claims, 3 Drawing Sheets

COIN-FILTER MOUNTING STRUCTURE

BACKGROUND OF THE INVENTION

1. Field of the Invention

The present invention relates to a structure for mounting a coin-filter filtering foreign materials such as dust or mote contained in hydraulic fluid on a fixing groove without using an O-ring. More particularly, a coin-filter surrounded by a holder is placed in a fixing groove formed at an inlet side of an orifice, and the holder is fixed to the fixing groove through plastic deformation by an outside power.

2. Description of the Related Art

Generally, since the heavy equipment including excavator is used to lift a lot of foreign materials such as dust or soil dust owing to the proper characters of heavy equipment, the hydraulic fluid in a hydraulic tank is polluted with the foreign materials.

If the hydraulic fluid polluted with foreign materials is not suitably purified, the efficiency of the heavy equipment is lowered or the parts such as hydraulic cylinder to which the hydraulic fluid is supplied are damaged by the foreign materials contained in the hydraulic fluid and thereby the life span of actuators is shortened.

As shown in FIG. 1, a coin-filter according to the conventional art comprises a body 3 having a fixing groove 2 formed at an inlet side of an orifice 1, a coin-filter 4 fixed at an inside of the fixing groove 2 for filtering foreign materials such as dust contained in hydraulic fluid, and an O-ring 5 tied to the fixing groove 2 for preventing the detachment of the coin-filter 4 from the fixing groove 2. In the FIG. 1, the reference numeral 6 denotes a holder supporting the outside of the coin-filter 4.

The above structure for mounting the coin-filter needs an O-ring 5 for fixing the coin-filter 4 to the fixing groove 2, results in the increase of manufacturing cost by increasing pertinent parts' number. So the competitive power is lowered in the aspect of price, and also the working efficiency is lowered since it is difficult to insert the O-ring 5 into the narrow fixing groove 2. Further, it is another problem that a size of the fixing groove 2 becomes big since a special fixing groove 2 should be formed in a body 3 for fixing said O-ring 5.

SUMMARY OF THE INVENTION

It is an object of the present invention to provide a structure for mounting a coin-filter on a fixing groove without O-ring so as to make the price competitive by lowering the manufacturing cost.

It is another object of the present invention to provide a structure for mounting a coin-filter on a fixing groove, wherein the coin-filter can be mounted even on a narrow fixing groove and shows sufficiently a proper function filtering out foreign materials by preventing a movement of the coin-filter after being mounted.

To achieve the above objects, a coin-filter mounting structure according to the present invention is composed of a body having a fixing groove formed at an inlet side of an orifice; and a holder supporting the border of a coin-filter filtering out foreign materials contained in hydraulic fluid flowing through the orifice and fixed to the fixing groove through plastic deformation after being mounted on the fixing groove.

According to a preferred embodiment, a through hole through which hydraulic fluid flows is formed at the center of said holder and an outside of said holder is a round shape or a polygonal shape. Also, a thickness t of said holder is a little bit greater than a height h of said fixing groove and an outside diameter d1 of said holder is a little bit smaller than an inside diameter d2 of said fixing groove. Further, said holder is made of malleable materials capable of plastic deformation by an outside power.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will now be described with reference to the accompanying drawings which are given only by way of illustration and thus are not limitative of the present invention.

Figure 1:
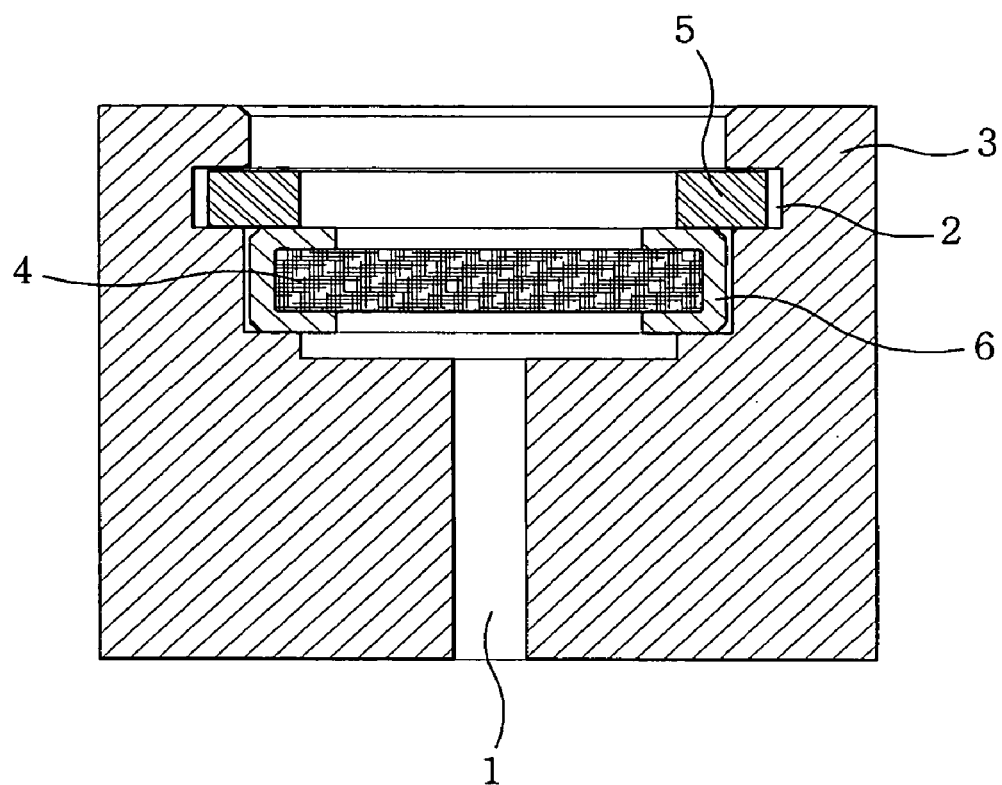
FIG. 1 is a cross-sectional view showing a coin-filter fixing state according to the conventional art.
Figure 2:
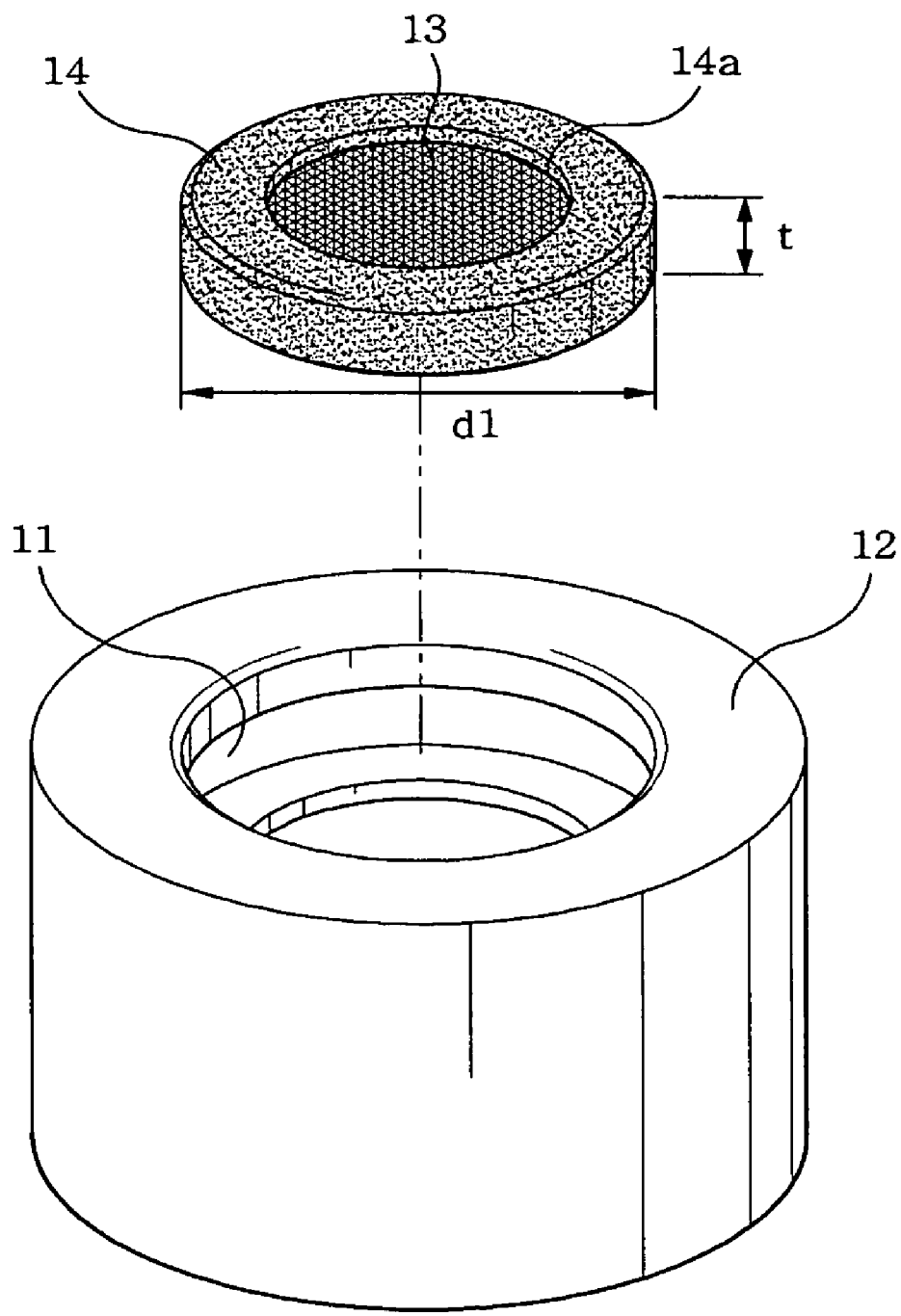
FIG. 2 is a perspective view showing a coin-filter mounting structure according to the present invention.
Figure 3:
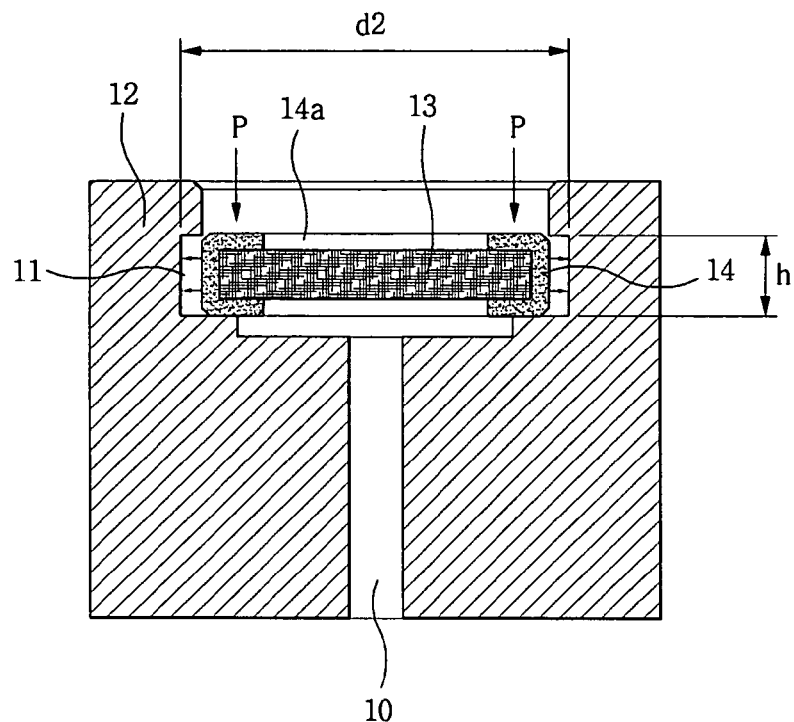
FIG. 3 is a cross-sectional view showing a state of a fixing groove before fixing a coin-filter.
Figure 4:
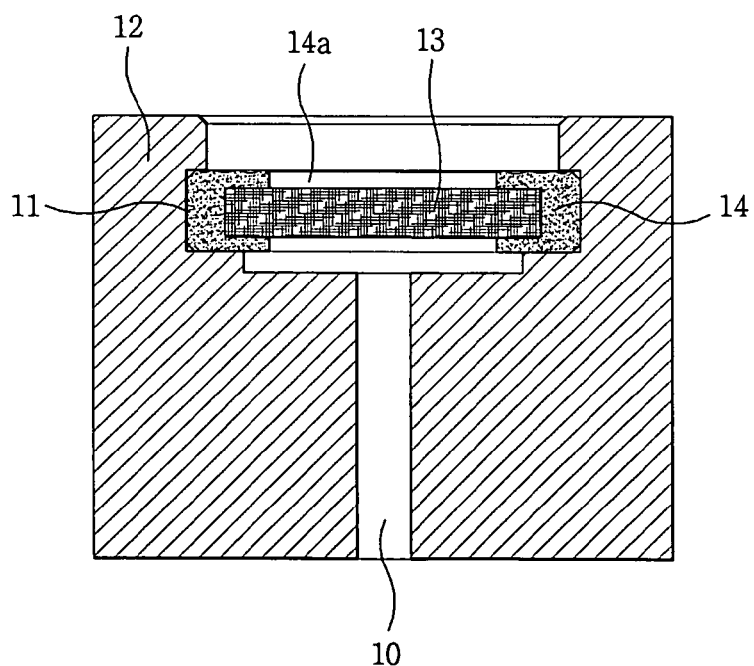
FIG. 4 is a cross-sectional view showing a state of a fixing groove after fixing a coin-filter.

As shown in FIG. 2 to FIG. 4, a coin-filter mounting structure according to the present invention comprises a body 12 having a fixing groove 11 formed at an inlet side of an orifice 10 and a holder 14 made of malleable materials supporting the border of a coin-filter 13 filtering out foreign materials contained in hydraulic fluid flowing through the orifice 10, and fixed to the fixing groove 11 through a plastic deformation by outside power after being mounted on the fixing groove 11. A though hole 14a is formed at a center of the holder 14 and an outside of the holder 14 can be various shapes, i.e., round shape or polygonal shape such as pentagonal shape, hexagonal shape, octagonal shape etc.

Hereinafter, a preferred embodiment according to the present invention will now be described with reference to the accompanying drawings.

As shown in FIG. 2, in a coin-filter mounting structure according to the present invention, a holder 14 is made of malleable materials capable of plastic deformation by an outside power and supports the border of a coin-filter 13.

As shown in FIG. 3, the coin-filter 13 is placed inside the fixing groove 11 formed at an inlet side of the orifice 10. At this time, a thickness t of the holder 14 is a little bit greater than a height h of the fixing groove 11 and an outside diameter d1 of the holder 14 is a little bit smaller than an inside diameter d2 of the fixing groove 11.

As shown in FIG. 3 and FIG. 4, the holder 14 on which the coin-filter 13 is mounted is pressed by a press or a pressing device in the vertical direction P (denoted as an arrow in FIG. 3) and thereby the holder 14 is expended in the direction of diameter thereof (denoted as an arrow in the horizontal direction). Namely, the thickness t of the holder 14 capable of plastic deformation is lessened and simultaneously the outside diameter d1 thereof is enlarged so that the holder 14 is fixed to the fixing groove 11 by stationary fit.

As described above, the outside of the holder 14 is expended through plastic deformation by the outside pressure and fixed to the inside of the fixing groove 11 in such a manner of sticking, and thereby the coin-filter 13 can be prevented from moving in the direction of up and down or right and left.

At this time, hydraulic fluid flowing through the body 12 passes through the coin-filter 13 via the through hole 14a of the holder 14 and the coin-filter 13 can filter out foreign materials contained in the hydraulic fluid. Therefore, the filtered hydraulic fluid is supplied to the orifice 10 and an inflow of foreign materials into the orifice can be prevented.

Since the coin-filter 13 can be fixed to the fixing groove 11 without O-ring, the working efficiency is improved and the coin-filter 13 can be easily fixed even into a narrow space of the fixing groove 11.

As described above, according to a coin-filter mounting structure disclosed in the present invention, the coin-filter can be fixed to the fixing groove without O-ring and pertinent parts' number can be decreased so that it is possible to have the competitive price by lowering the manufacturing cost.

Also, the coin-filter can be fixed even into a narrow space of fixing groove and has a proper function filtering out foreign materials by preventing the movement of the coin-filter in the direction of up and down or right and left after being mounted.

What is claimed is:

1. In a coin-filter mounting structure comprising:
   a body having a fixing groove at an inlet side of an orifice; and
   a holder for receiving a border of a coin-filter,
   the improvements wherein said holder has a first outside diameter smaller than an inside diameter of said fixing groove for positioning said holder at said fixing groove and the holder has a thickness which is substantially greater than the height of the fixing groove and; means for fixing said holder into said fixing groove, said means comprising plastic deformability of at least a portion of said holder to a second thickness sealingly fitting said height of the fixing groove and the deformability of the holder; to a second outside diameter greater than said inside diameter of said fixing groove after said holder has been positioned at said fixing groove.

2. The coin-filter mounting structure as set forth in claim 1, wherein said said means comprising plastic deformability is a malleable material of said holder.

3. A coin-filter mounting structure comprising:
   a body having a fixing groove formed at an inlet side of an orifice; and
   a holder receiving the border of a coin-filter filtering out foreign materials contained in hydraulic fluid flowing through said orifice, and said holder is adapted to be fixed to said fixing groove through plastic deformation after being mounted on said fixing groove,
   wherein a thickness of said holder is substantially greater than a height of said fixing groove prior to plastic deformation of the holder, and
   an outside diameter of said holder is substantially smaller than an inside diameter of said fixing groove prior to plastic deformation of the holder.

* * * * *